United States Patent Office 3,465,179
Patented Sept. 2, 1969

3,465,179
MAGNETOHYDRODYNAMIC ACCELERATOR OR CONVERTER DUCT FOR REDUCING THE DISADVANTAGES OF THE HALL EFFECT
Pierre Ricateau, Garches, France, assignor to Commissariat a l'Energie Atomique, Paris, France
Filed Mar. 23, 1967, Ser. No. 625,435
Claims priority, application France, Apr. 5, 1966, 56,562
Int. Cl. H02k 45/00; G21d 7/02
U.S. Cl. 310—11                                13 Claims

ABSTRACT OF THE DISCLOSURE

An MHD accelerator or converter duct for reducing the disadvantages arising from the Hall of effect in the vicinity of the duct walls and characterized in that the angle made by a line tangent to the transverse cross-section with the direction of the magnetic field is at least 30° over the greater part of the perimeter of the transverse cross-section.

---

The present invention relates to a magnetohydrodynamic (MHD) accelerator or converter duct of improved design for the purpose of reducing the disadvantages arising from the Hall effect in the vicinity of the electrode-supporting duct-walls.

The type of duct to which the invention applies is described in the document entitled "Electricity from MHD—Proceedings of the Symposium of Salzburg," as published by the International Atomic Energy Agency, Vienna, in July 1966, volume 2, pages 478–479, 504–505, 570–571–572.

As shown in FIG. 1 of the accompanying drawings, an MHD duct is usually constructed in the form of a straight channel 2 having a rectangular cross-sectional configuration (designated by the reference 4) having sides parallel to the directions OX, OZ of a reference trirectangular trihedron. A gaseous fluid which is seeded with an alkali metal flows through the duct along the longitudinal axis or flow axis OY which is the third direction of the trihedron and a magnetic field having a direction parallel to OZ is applied to the fluid in motion. Electrical energy can be either applied or collected, depending on whether it is desired to accelerate the particles of the fluid or to produce electrical energy, between electrodes disposed on the faces which are parallel to the plane ZOY, the faces which are parallel to the plane XOY being insulating.

The current lines in the electrodes are parallel to XOY by reason of symmetry.

It can be demonstrated that the conditions of operation of the duct which are the most favorable for effective MHD conversion are achieved when the current lines are parallel to OX at all points and consequently perpendicular to the direction of flow. It is known that, as a result of the Hall effect, the current lines cannot be perpendicular to the electrode and therefore cannot be parallel in the vicinity of this latter. The current vector and the line which is normal to the electrodes make an angle $\theta$ or so-called Hall angle which has the effect of deforming the current lines in this region.

When the Hall effect is negligible, that is to say if $\theta$ is substantially smaller than 45° or if, to use an equivalent expression, the tangent $\theta = \beta$ is much smaller than 1, then the direction of the current is substantially normal to the electrodes and additional losses arising from deformation of the field are low, and the electrode can thus cover the entire wall surface.

When the Hall effect is no longer negligible, it is necessary in that case to replace the single electrode by a number of electrodes which are separated from each other by intercalary insulators. Under these conditions, and provided that the different electrodes are brought to suitable separate potentials, the current lines can retain a direction which is perpendicular to the flow in that portion of the stream of fluid in motion which is not adjacent to the electrode-supporting duct-walls. A distribution of potentials is thus achieved by connecting opposite electrodes in pairs to electrically independent circuits. It is also possible to provide equipotential connections. These different arrangements are described at some length in the published literature relating to MHD.

On the other hand, in the region adjacent to the electrode-supporting duct-walls, the current lines cannot be parallel to the direction OX as a result of the limiting conditions which are imposed. There is observed a distortion of the current lines which are not uniformly distributed and an increase in Joule-effect losses which gives rise to faulty operation of the generator.

The losses appear in the first place by reason of the fact that the useful electrode surface for the passage of the current is small, with the result that the current density increases accordingly. It should be noted that this phenomenon is not directly related to the Hall effect.

Furthermore, the Hall phenomenon is directly accompanied by an increase in losses in the vicinity of the walls which are lined with electrodes, this being so for two main reasons.

There takes place in the vicinity of the electrodes an inclination of the current lines relative to the direction OX (Hall angle $\theta$). In other words, it may be stated that the apparent conductivity of the gas along a line at right angles to the surface of the electrodes (ratio of the pependicular current component to the amplitude of the electric field) has the value:

$$\frac{\sigma}{1+\beta^2}$$

wherein $\sigma$ is the conductivity in the case of a zero Hall angle $\theta = 0$, and $\beta$ is the tangent of said angle.

In the vicinity of the inter-electrode or intercalary insulating elements, the potential difference between two adjacent electrodes produces at this point an electric field having a component along OY, the mean value $E'_y$ of which is at least equal to the value $E_y$ of the electric field in the non-perturbed regions of duct and in particular in the central region. In said central region, the direction of the current is perpendicular to the flow of fluid and we may write:

$$\beta j/\sigma = E_y$$

$j$ being the modulus of the current density whereas, alongside the insulator, the perpendicular current component is zero and we may then write:

$$\frac{\beta j'}{\sigma} = E'_y \sim E_y \frac{\beta j}{\sigma}$$

It should be noted that the letters which are followed by the prime index denote the mean values in the vicinity of the electrode surface whilst the letters without indices denote values in the non-perturbed central region of the duct.

The mean values are calculated in this case on paths which pass alongside the insulating element in the direction OY and which are limited to the width $$\perp$$

of the intercalary insulator.

In the case in which the conductivities σ and σ' are equal, the above relation is written:

$$j' \sim \beta j$$

Therefore, if the Hall effect is substantial, the current density can be considerably higher near the electrode-carrying walls than at the center of the gas stream. Moreover, in the case of converters and of some accelerators, the conductivity is an increasing function of the current, with the result that even greater losses are liable to occur.

One solution which has been proposed for reducing these losses to a substantial extent by making the current lines perpendicular to the electrodes over their entire surface consists in the use of electrodes of semi-conducting material of special shape and suitably arranged. While wholly satisfactory in principle, this solution is nevertheless difficult to apply in practice since it pre-supposes that the semi-conductor employed has a given conductivity and a shape of electrode which is also pre-established. The conditions which these conductivities must satisfy as well as those which result from the corrosive action of the fluid, from erosion processes or, in short, from the modes of operation adopted are hardly compatible.

The present invention relates to a duct which has a transverse section of special shape so as to reduce to a substantial extent the Hall effect losses which arise in the vicinity of the walls which are fitted with electrodes.

A magnetohydrodynamic accelerator or converter duct in accordance with the invention is characterized in that the transverse cross-sectional configuration of said duct is so determined that the angle made by a line tangent to said transverse cross-section with the direction of the magnetic field is at least 30° over the greater part of the perimeter of said cross-section.

As a rule, it is merely necessary to ensure that the portion of the perimeter in which the above condition is satisfied is not less than approximately 80%. However, in some instances, it proves advisable to ensure that the portion of the transverse cross-sectional perimeter in which the above condition is not satisfied is less than 1%.

In many MHD ducts, the transverse cross-section is of polygonal configuration and comprises two parallel insulating faces in a direction at right angles to the magnetic field.

In the simplest form of construction, the transverse cross-section has the shape of a hexagon, the sides corresponding to the insulating walls being perpendicular to the magnetic field whilst the other sides corresponding to the walls which carry the electrodes make angles of approximately 45° with the direction of the magnetic field.

An alternative form of construction which relates to a structure having cylindrical symmetry is obtained by joining the insulating walls which are perpendicular to the magnetic field by means of walls having a staggered-line profile so that the different portions of this line are oriented at an angle of approximately 45° relative to the magnetic field.

The corners of the transverse cross-section hereinabove described can be rounded. The disadvantage of this arrangement lies in the fact that some planes which are tangent to the duct are in that case parallel to the magnetic field.

It is possible to reduce the length of those portions of the perimeter of the cross-section of the duct in which the tangent is parallel to the magnetic field by forming sharply-defined corners.

A further improvement consists in joining the adjacent sides of the transverse cross-section of the duct by means of externally tangent circular arcs when the sides referred-to are oriented on each side of a direction at right angles to the magnetic field.

Those portions of the duct along which the electrodes are set in spaced relation can consist of a stack of spacer members of identical shape which are alternatively conductive and insulating and oriented parallel to the equipotential planes.

In addition to the principal arrangements hereinabove described, the invention also extends to a number of different secondary arrangements which will be mentioned below in regard to the forms of construction of the device according to the invention.

In order that the technical characteristics of the present invention may be more readily understood, consideration will be given in the following description to a number of MHD ducts having a cross-sectional configuration which is determined according to the invention, it being understood that the examples given are not intended to imply any limitation either in the modes of application or the potential uses of the invention.

The essential object of the present invention is to endow the MHD duct with a cross-sectional configuration other than rectangular in order to ensure that no portion of the periphery of the cross-section should be close to the direction of the magnetic field or at least in order to ensure that any such portion should be as short as conveniently possible.

A simple but unrestrictive reasoning shows how it is possible by means of this novel arrangement to reduce abnormal losses arising from the Hall effect.

It is known that, within the MHD duct and in the vicinity of the electrodes, the apparent conductivity of the fluid along a line perpendicular to the surface of an electrode parallel to YOZ is:

$$\frac{\sigma}{1+\beta^2}$$

in the case of a Hall effect ($\beta$=tangent $\theta$) if the electrode is inclined with respect to the direction of the magnetic field at an angle $i$, the tangent of which is designated by the symbol $t$, the apparent conductivity of the fluid along the perpendicular axis becomes:

$$\frac{\sigma}{1+\beta^2} \frac{1+t^2(1+\beta^2)}{1+t^2}$$

The slope of the electrode-carrying wall which is represented in this formula by its tangent $t$ tends to restore the conductivity to its initial value in spite of the Hall effect which is represented by $\beta$. The arrangement according to the invention is even more effective as the value of $t$ contains and even exceeds 1, which corresponds to an angle of slope either equal to or greater than 45°.

As a result of the slope of the electrode duct-wall with respect to the direction of the magnetic field, a current component in the transverse direction OX can be observed in the vicinity of an intercalary insulator. The existence of this component has a favorable action. In fact, with the notations already employed, it can be shown that the modulus of current density is given approximately by the following expression:

$$\frac{1+t^2(1+\beta^2)}{1+t^2}\frac{j'}{\sigma} = E'_y E_y = \frac{\beta j}{\sigma}$$

It can readily be seen that the moduli of current densities $j'$ in the vicinity of the insulating elements and $j$ in the non-perturbed region are brought back to comparable values if the angle of slope is either close to 45° or higher than this value.

It may be stated that the slope of the walls relative to the direction of the magnetic field produces substantial regularization in the current distribution within the accelerator or converter duct and consequently brings the operation closer to theoretical conditions.

Figure 2:
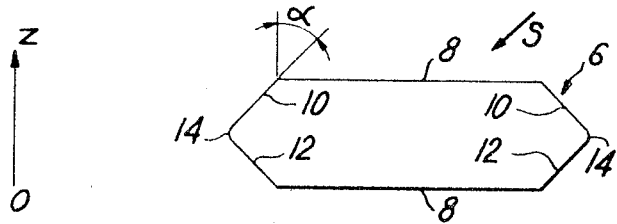
FIG. 2 is a diagram of the profile of a duct having a hexagonal cross-section.

FIG. 2 represents the simplest possible cross-section S of a duct 6 in accordance with the invention. The sides 8 represent in cross-section the top and bottom insulating faces. The sides 10 and 12 represent in cross-section the electrode-supporting faces; the angle made by said sides with the direction OZ of the magnetic field is 45°. It is readily apparent that only the rounded summits 14 have a tangent which is parallel to the magnetic field over a certain distance.

Figure 3:
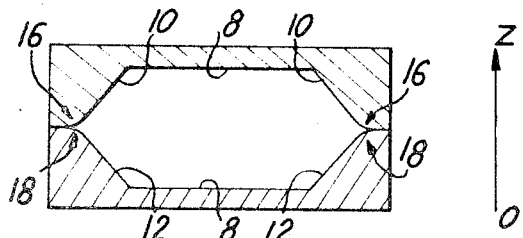
FIG. 3 shows the profile of a cross-section of the same type in which no element makes an angle with the magnetic field which is smaller than 45°.

Should it be desired to construct a duct in which no portion has a tangent parallel to the direction of the magnetic field, the cross-section of said duct can be provided with sharply-defined corners; alternatively, the arrangement illustrated in FIG. 3 could be adopted.

It will be noted that the ducts of FIGS. 2 and 3 are provided with similar portions which are designated in both figures by identical reference numerals. However, in FIG. 3, the inclined faces 10 and 12 are joined by means of circular arcs 16-18 which are tangent externally. From a study of the figure, it is seen that the angle made by the different parts of the profile with the direction OZ of the magnetic field is in no case smaller than 45°.

FIGS. 2 and 3 illustrate the simplest application of utilization of sloping walls which consists in employing as an electrode support two pairs of walls which are inclined at an angle of 90° to each other. This arrangement ensures that the transverse cross-section retains symmetry with respect to the plane XOY. In the case of FIG. 2, this arrangement limits to the points 14 those regions which have tangents parallel to the magnetic field and in which the stray component of the current along OY can attain high values along the intercalary insulating elements.

The theoretical considerations which have been set forth in the foregoing lead to the use of walls 10-12 which are inclined at an angle $i$ with respect to the direction of the magnetic field. However, it is not an advantage to choose an angle $i$ which is too great since it entails the need to increase the distance between the two points 14 to a substantial extent, thereby resulting in a shape which is unfavorable to flow motion. An angle of slope in the vicinity of 45° makes it possible to correct current distortions in a satisfactory manner and is not subject to any disadvantage in regard to the aerodynamic characteristics of the duct.

The term which is introduced by the slope of the walls in the expression of conductivity is:

$$\sqrt{\frac{1+t^2(1+\beta^2)}{1+t^2}}$$

and the effect of slope is correspondingly more marked as the product $t^2\beta^2$ is not negligible compared with 1. It is noted that an angle of slope of 30° is sufficient to achieve an appreciable improvement in the case of a substantial Hall effect.

Figure 1:
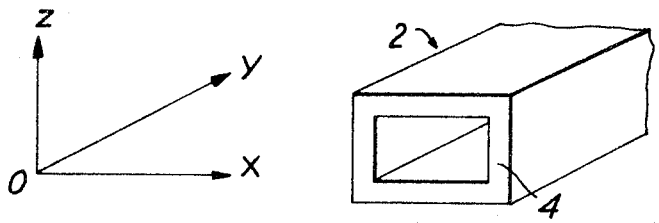
FIG. 1 is a diagram of a conventional rectangular MHD duct.

As has already been explained, the slope of the walls which carry electrodes regularizes the distribution of currents in the vicinity of said electrodes while at the same time destroying the cylindrical symmetry in the direction OZ which a conventional duct as shown in FIG. 1 is assumed to have, at least theoretically.

Figure 4:
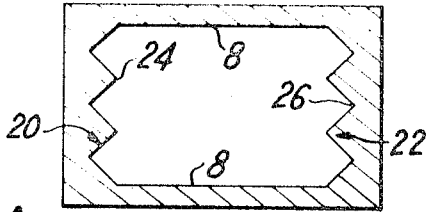
FIG. 4 shows the profile of a duct in which the disadvantages of lack of symmetry are attenuated.

The utilization of a duct having a profile as shown in FIG. 4 permits an approximation to a structure which has a cylindrical symmetry. In this case, the parallel top and bottom walls are also insulating, and the side walls 20-22 which support the electrodes have a regular staggered-line profile. This arrangement is advantageous if the cross-section of the duct is close to a square shape. The disadvantages arising from this structure are due to the plurality of angular points such as 24-26 which are conductive to the appearance of stray currents parallel to OY along the insulating elements. This form of duct again results in relatively high losses when the conductivity increases rapidly as a function of the current.

Sonsideration will now be given to the structure of ducts and in particular to that of the side walls.

In one of the arrangements usually adopted, these side walls are constituted by a stack of elements of identical shape which are alternately insulating and conductive.

Figure 5:
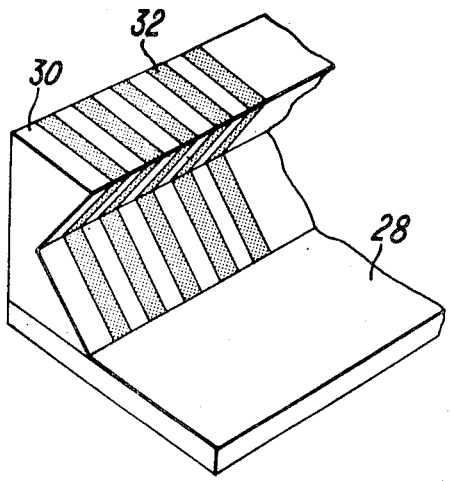
FIG. 5 is a fragmentary view of a duct whose lateral walls are made up of a stack of elements of identical shape which are alternately conductive and insulating, these elements being oriented at right angles to the direction of propagation of the fluid.

In the case of a duct having the transverse cross-section known in FIG. 5 in which the insulating walls are formed by panels 28 oriented at right angles to the magnetic field, the side walls are formed by a stack of spacer members which are alternately insulating, as designated by the reference numeral 30, and conducting, as designated by the numeral 32, and have a right-angled reentrant portion.

In the case of a duct which has the transverse cross-section of FIG. 4, the same duct structure can be employed, the only difference being that the spacer members have a saw-tooth profile and can be formed by placing a number of single elements 30 and 32 one against the other.

The spacer members can be disposed at right angle to the direction of flow. However, this arrangement is not always the most favorable. Under normal operating conditions, the duct can have plane equipotential surfaces which are both parallel and sloping with respect to the direction of flow of fluid (OY).

In this case, it can be an advantage to make use of spacer members oriented in such a manner as to be inclined to the axis OY in the same manner as the equipotential planes.

The shape of the spacer members must be determined so that, taking into account their angle of inclination, the MHD duct or channel should have the desired configuration.

The oblique arrangement of the spacer members is suitable in the case of ducts having transverse sections as illustrated in FIGS. 2, 3 and 4. However, if a lateral saw-tooth profile is adopted, it may be noted that, all other things being equal, the slantwise arrangement of said spacer members is of less practical interest as the number of teeth is greater.

The structure which has just been discussed is theoretically advantageous. However, it is possible in practice to retain the transverse structural arrangement if the angle of slope of the equipotential planes relative to the direction of flow of fluid is small or if the tooth pitch adopted is small compared with the larger dimension of the cross-section.

Two basic types of structure can be distinguished: a structure with external connections in which the electrodes are either connected to each other or to the external load circuits by means of connections external to the duct and a structure with internal connections in which the electrodes are connected together in pairs by means of equipotential connections incorporated in the walls which are parallel to XOY and which are consequently in contact with the gas.

Figure 7:
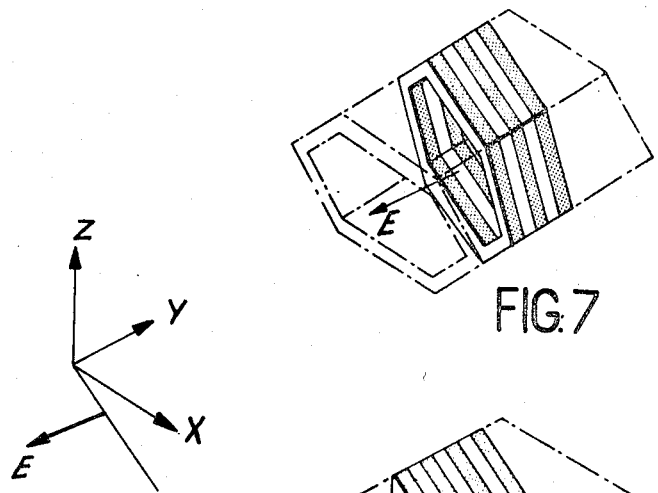
FIG. 7 shows a duct in accordance with the invention, by way of comparison with the duct shown in FIG. 6.
Figure 6:
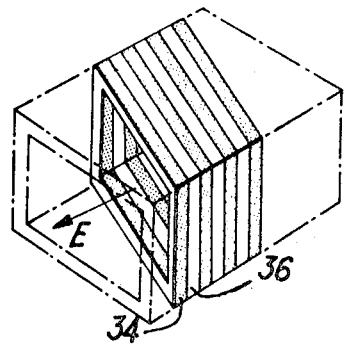
FIG. 6 shows a duct structure of the type employed in the prior art, said structure being constituted by a stack of elements of identical profile which are alternately conductive and insulating, these elements being oriented parallel to the equipotential planes and at an oblique angle with respect to the axis of flow of the fluid.

The external-connection structure does not call for any particular comment. The internal-connection structure which is applicable to the so-called Montardy configuration and to the so-called Hall configuration is constructed in known manner with a stack consisting of alternately conductive rings 34 and insulating rings 36 (as shown in FIG. 6). It is clear from the theory of sloping walls that those portions of the conductive rings which are parallel to XOY and which consequently form connections will perform the function of electrodes to a greater extent than the portions which are parallel to OZ by virtue of the low value of apparent resistivity of the gas at right angles to the surface of the electrodes. A favorable result thereby achieved is that said portions will serve to render the plane of the conductive ring equipotential. However, a less desirable result is that a large proportion of the current will not reach the portions which are parallel to OZ. As a consequence, the current density will be of a high order in the vicinity of those portions which are parallel to XOY but will be of a low order in the vicinity of those portions which are parallel to the line OZ. If the portions which are parallel to OZ are modified according to the principle of sloping walls, this faulty current distribution which is inherent to internal-connection ducts will in turn be attenuated to a considerable extent. It is clear that a duct of the internal connection type shown in FIG. 7 in which provision is made for the arrangements noted above, namely in which the planes of the conductive rings are parallel to the theoretical equipotential planes, achieves an optimum equipotential state of said first planes since the entire periphery of each conductive ring is in good contact with the gas.

The arrangement described in the foregoing can be executed with ease and the performances of internal-connection ducts of the Montardy or Hall type are therefore considerably improved.

What I claim is:

1. A magnetohydrodynamic generator duct which reduces the disadvantages arising from the Hall effect in the vicinity of the duct walls, in which the angle made by a line tangent to the transverse cross-section of the duct with the direction of the magnetic field is at least 30° for 99% of the perimeter of said transverse cross-section.

2. A magnetohydrodynamic generator duct in accordance with claim 1, the transverse cross-section of the duct having a polygonal shape.

3. A magnetohydrodynamic generator duct in accordance with claim 2, the transverse cross-section of the duct having the shape of a symmetrical hexagon comprising two sides perpendicular to the direction of the magnetic field.

4. A magnetohydrodynamic generator duct in accordance with claim 2, the transverse cross-section having two sides perpendicular to the direction of the magnetic field and joined by saw-tooth profiles.

5. A magnetohydrodynamic generator duct in accordance with claim 2, the adjacent sides of the transverse cross-section of the duct being oriented on each side of a direction perpendicular to the magnetic field forming a sharply-defined corner.

6. A magnetohydrodynamic generator duct in accordance with claim 2, the adjacent sides of the duct being oriented on each side of a direction perpendicular to the magnetic field and joined by a rounded profile.

7. A magnetohydrodynamic generator duct in accordance with claim 2, the adjacent sides of the duct being oriented on each side of a direction perpendicular to the magnetic field and joined by two externally tangent circular arcs.

8. A magnetohydrodynamic generator duct in accordance with claim 1, comprising two walls perpendicular to the direction of the magnetic field, said walls being completely insulating.

9. A magnetohydrodynamic generator duct in accordance with claim 8, said two walls being perpendicular to the direction of the magnetic field and including metallic interelectrode connections and intercalary insulators.

10. A magnetohydrodynamic generator duct in accordance with claim 1, including two walls for the duct covered with electrodes and having the internal surface of each electrode defined by two planes perpendicular to the axis of the duct.

11. A magnetohydrodynamic generator duct in accordance with claim 1, including two walls for the duct covered with electrodes and the internal surface of each electrode being defined by two planes parallel to the equipotential planes of the duct under normal operating conditions.

12. A magnetohydrodynamic generator duct in accordance with claim 1, the electrode-supporting walls of the duct comprising a stack of elements of identical profiles and alternately conductive and insulating.

13. A magnetohydrodynamic generator duct in accordance with claim 12, said elements being alternatively conductive and insulating.

References Cited
UNITED STATES PATENTS

| | | | |
|---|---|---|---|
| 3,149,247 | 9/1964 | Cobine et al. | 310—11 |
| 3,183,380 | 5/1965 | Hurwitz et al. | 310—11 |
| 3,355,607 | 11/1967 | Rosa | 310—11 |
| 3,387,150 | 6/1968 | Powers et al. | 310—11 |

MILTON O. HIRSHFIELD, Primary Examiner

D. F. DUGGAN, Assistant Examiner